3,644,391
PROCESS FOR PREPARING 4(5)-NITRO-
IMIDAZOLES
William A. Sklarz, Clark, Victor J. Grenda, Warren,
Glenn W. Lindberg, Metuchen, and Albert D. Epstein,
Edison, N.J., assignors to Merck & Co., Inc., Rahway,
N.J.
No Drawing. Filed Nov. 1, 1968, Ser. No. 772,839
Int. Cl. C07d 49/36
U.S. Cl. 260—309                3 Claims

ABSTRACT OF THE DISCLOSURE

Improved process for preparing 4(5)-nitroimidazoles by nitrating imidazole compounds using an anhydrous sulfuric acid and nitric acid reaction medium containing an excess of free sulfur trioxide during the entire nitration.

BACKGROUND OF THE INVENTION

Field of the invention

This invention relates to a process for preparing 4(5)-nitroimidazoles and more particularly pertains to a process giving higher yields of 1(3)-unsubstituted-4(5)-nitroimidazoles than obtained by previously known methods.

Description of the prior art

Nitroimidazoles are very important and useful articles of commerce. 4(5)-nitroimidazoles are particularly useful as intermediates in chemical synthesis of well-known and useful compounds. The preparation of nitroimidazoles by nitration with a hydrous mixture of nitric and sulfuric acids is known; however, the yields obtained in many cases are not sufficiently high to render the prior art methods commercially attractive.

In conventional hydrous sulfuric-nitric acid nitration of imidazole or its alkyl or phenyl derivatives, the entering nitro group occupies, without exception, the 4- or 5-position provided either position is unsubstituted. With phenyl derivatives they undergo additional nitration on the phenyl radical predominantly in the para position.

SUMMARY OF THE INVENTION

The general purpose of this invention is to provide an improved process for producing 1(3)-unsubstituted-4(5)-nitroimidazoles in greater yield than has heretofore been demonstrated. Yields of over 75% are obtained by employing a nitric acid-sulfuric acid nitrating mixture containing excess sulfur trioxide; the excess sulfur trioxide insuring anhydrous conditions during the entire nitration reaction.

In nitrating 1(3)-unsubstituted imidazoles, i.e. those having a hydrogen atom attached to one of the nitrogen atoms located at the one or three ring position, we have found that hydrous nitration conditions cause low yields of the desired 4(5)-nitro derivative. Low yields are believed due to ring cleavage caused by the presence of water, as is illustrated below for imidazole, whereas an anhydrous system gives good yields of the desired 4(5)-nitro compound.

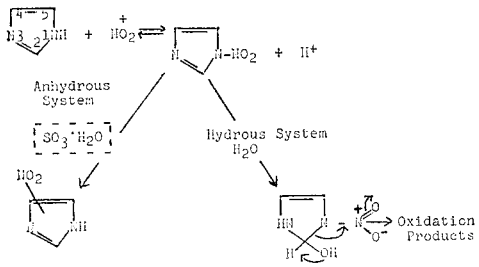

Nitration forms a N-nitro intermediate compound which makes the ring susceptible to oxidation at the two position in the hydrous nitric acid system and results in ring cleavage and further oxidation of the broken ring.

The yield of 4(5)-nitroimidazole is proportional to the concentration of excess sulfur trioxide present in the reaction mixture, the concentration calculated assuming all ingredients have been added and 100% nitration has occurred. Yields of other substituted-4(5)-nitroimidazole compounds are substantially improved by the anhydrous process of this invention.

In addition to the advantages of greater yield, the instant invention reduces cost by reducing the quantity of raw material required and reduces the time necessary for nitration.

An object of the present invention is to provide an improved process for preparing 1(3)-unsubstituted-4(5)-nitroimidazoles.

A further object of the present invention is to provide improved yields in nitration of imidazoles by maintaining the nitration mixture in an anhydrous condition during the entire nitration using an excess of sulfur trioxide.

DESCRIPTION OF THE PREFERRED EMBODIMENTS

In accordance with our invention we have found that the yield of nitrated 1(3)-unsubstituted imidazoles is improved by the presence of sulfur trioxide in the reaction mixture during the entire nitration.

The following table illustrates the improvement in yield by the process of this invention.

| Conc. of excess $SO_3$* in the reaction mixture after nitration, wt. percent | Yield of 4(5)-nitroimidazole, percent |
|---|---|
| 0 | 20–63 |
| 10.8 | 82 |
| 15.0 | 86 |
| 17.1 | 91.3 |

\* Assumes 100% nitration.

The table clearly illustrates the unexpected proportional increase of 4(5)-nitroimidazole yield with increasing excess $SO_3$ content in the reaction mixture. The term excess sulfur trioxide, as used in the specification, is the amount of $SO_3$ supplied by oleum, sulfan B or other source, less $SO_3$ required to react with water (introduced by the sulfuric acid and nitric acid) to form an initially anhydrous system, and less the $SO_3$ necessary to react with water of reaction given off during nitration.

Nitration of substituted imidazoles, having a hydrogen atom attached to the nitrogen at the 1(3)-position on the imidazole ring and having at least one of the 4(5) carbons unsubstituted, is accomplished in the same manner as nitrating imidazole, with the presence of sulfur trioxide insuring improved yields of the corresponding 4(5)-nitro derivatives. Preferably at least 10% excess sulfur trioxide is employed although greater and lesser amounts give good yield provided an excess of sulfur trioxide is present during the entire nitration.

Representative of the 1(3)-unsubstituted-4(5)-nitroimidazole prepared by the process of this invention are compounds of the general formula

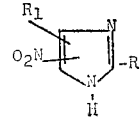

where R and $R_1$ may be the same or different radicals selected from the group consisting of hydrogen: halo such as iodo, bromo, chloro or the like; alkyl such as methyl, ethyl, isopropyl, butyl, hexyl or the like; aralkyl having 1–10 carbon atoms such as phenethyl, benzyl or the like; aryl such as phenyl, nitrophenyl, chlorophenyl, carboxamidophenyl and alkaryl having 1–12 carbon atoms such as tolyl, xylyl or the like.

The nitration of imidazoles, in accordance with this invention, is done by adding an imidazole compound to a nitric acid-sulfuric acid-$SO_3$ reaction mixture and allowing the temperature to increase until reaction occurs.

The imidazole is preferably mixed in acid and combined with a nitrating mixture containing nitric acid and oleum or other sulfur trioxide-sulfuric acid source. The proportions and concentrations of reactants are controlled to obtain a calculated initial reaction mixture which will contain an excess of free sulfur trioxide after 100% nitration. Reaction occurs on combining the imidazole compound and the nitrating mixture to yield the corresponding 4(5)-nitroimidazole derivative. After nitration is completed, the reaction mixture is quenched and alkali is added to precipitate the 4(5)-nitro substituted compound which is collected, washed and dried.

An acid mixture of the imidazole compound is normally prepared to prevent decomposition which occurs if imidazoles are added directly to the nitration mixture. The mixture is prepared by adding the imidazole compound to acid, for example sulfuric or nitric. From 1–3.5 ml. of acid per gram of the imidazole is employed. Concentrated acid is preferably employed to reduce the quantity of free water available for reaction with sulfur trioxide in the final reaction mixture. Normally from 1.0–2.7 ml./gm. of the imidazole of concentrated (98%) sulfuric acid is employed with 1.2–2.0 ml. preferred. 1.4 ml. of sulfuric acid gives a good concentrated solution. Ideally, a low ratio of concentrated acid to imidazole is employed to minimize water dilution of the reaction mixture. If desired, hot solutions may be employed to form highly concentrated solutions. Phenyl substituted imidazole compounds are not necessarily predissolved in acid before nitration, since the phenyl compounds do not usually decompose.

The nitrating mixture is prepared by combining nitric acid with oleum, sulfan B in oleum, anhydrous sulfur trioxide in concentrated sulfuric acid, or other $SO_3$ containing source. White fuming nitric acid ($\geq 90\%$) is preferred to prevent dilution of the final reaction mixture by water present in the acid. Red fuming nitric acid, containing an excess of $NO_2$, may be employed if desired. Oleum is normally employed as the sulfur trioxide source with 65% oleum preferred to maximize the $SO_3$ content of the reaction mixture.

The amount of sulfuric acid employed in the nitrating mixture is normally in excess of one mole of sulfuric acid per mole of the imidazole compound to be nitrated. The exact proportion is not critical, although 5 moles or more of acid may tend to introduce an undesirable amount of water, even where concentrated acid is employed.

The amount of nitric acid employed in the nitrating mixture is normally in excess of that necessary for the nitration. Thus, it is sufficient if there is present in the nitrating mixture about 1 to about 5 moles of nitric acid, preferably about 1.1–1.5 moles of nitric acid per mole of the imidazole compound to be nitrated. When nitrating phenyl-substituted imidazoles the quantity of nitric acid is at least doubled where nitration of the phenyl radical is expected.

A sufficient amount of oleum, sulfan B or other sulfur trioxide source, is used in the nitrating mixture so that there is excess sulfur trioxide present in the reaction mixture after nitration (assuming 100% nitration).

The mixed nitric acid-sulfuric acid-sulfur trioxide nitration mixture and the imidazole-acid mixture are slowly combined, with the heat of reaction being controlled so that nitration is effected from 20°–170° C., but preferably between 50°–90° C. A reaction time of several hours may be employed although less than 30 minutes is normally sufficient, at higher temperature, to complete the nitration.

Upon completion of the nitration step, the reaction mixture is quenched by diluting with water, which hydrates free $SO_3$.

The 4(5)-nitroimidazole compound is then precipitated by neutralizing the quenched reaction mixture with alkali, for example ammonia, sodium hydroxide, potassium hydroxide or the like. If desired, the neutralization may be effected simultaneously with the quenching step. Phenyl derivatives are generally insoluble and recovered without neutralization.

The following examples illustrate methods of carrying out the present invention and are given for the purpose of illustration, and not by way of limitation.

EXAMPLE 1—ANHYDROUS PROCESS

A nitration mixture is prepared, with stirring while under dry nitrogen, in a 250 ml. three-necked flask containing 70 ml. of 30% oleum by dropwise addition of 19.7 ml. of 98% nitric acid and 17.5 ml. of sulfan B. A Dry Ice acetone cooling bath is employed during the addition to maintain the temperature between 15°–30° C.

An acid mixture of 2-methylimidazole is prepared by adding 20 g. 2-methylimidazole to 50 ml. of 96% by weight sulfuric acid while maintaining the mixture temperature at about 20° C. using a cooling bath. A nitrogen atmosphere is maintained to prevent hydration.

The acid mixture is added dropwise, over a three-hour period with stirring, to the nitration mixture at about 25° C. The resulting reaction mixture is aged one hour at 25° C. and then quenched by pouring onto 250 g. of ice with stirring.

The quenched mixture is brought to pH 2.0–2.5 by adding dropwise 298 ml. of 11.7 N sodium hydroxide with stirring while the temperature is maintained below 60° C. The mixture is filtered and the recovered solids are washed with 1× 50 ml. of water at 50° C. The cake is reslurried with 140 ml. of water, filtered, washed and dried to give 24.1 g. of 2-methyl-4(5)-nitroimidazole, M.P. 251°–252° C., for a yield of 76%. Calculated excess $SO_3$ after nitration is 11.4%.

EXAMPLE 2—ANHYDROUS PROCESS

A nitration mixture is prepared, under dry nitrogen and with stirring, in a 250 ml. three-necked flask containing 153 ml. of 30% oleum by slowly adding 19.6 ml. of 98% nitric acid. The contents of the flask is maintained below 25° C. by the use of an ice bath.

An acid mixture of 2-methylimidazole is prepared by adding 10 g. of 2-methylimidazole to 25 ml. of 95% by weight sulfuric acid while maintaining the temperature at about 25° C. using a cooling bath. The acid mixture is added slowly to the nitration mixture. The resulting reaction mixture is allowed to warm and is aged for about 2 hours. The mixture is then quenched by pouring over ice and is adjusted with sodium hydroxide or ammonia to a pH of about 2.0. The resulting precipitate is removed by filtration and washed with water to give a 82–87% yield of 2-methyl-4(5)-nitroimidazole, M.P. 250°–252° C. Calculated excess $SO_3$ after nitration is 17%.

When the process of Example 2 is repeated employing: 2-propylimidazole, 4(5)-ethylimidazole, 2,4(5)-dimethylimidazole, 4(5) - bromoimidazole, 2 - methyl-5-chloroimidazole, 2 - benzylimidazole, 2 - methyl-4(5)-benzylimidazole and 4(5)-tolylimidazole, there is obtained the corresponding 2-propyl-4(5)-nitroimidazole, 4(5)-ethyl - 5(4)-nitroimidazole, 2,4(5)-dimethyl-5(4)-nitroimidazole, 4(5)-bromo-5(4)-nitroimidazole, 2-methyl-5-chloro-4-nitroimidazole, 2-benzyl-4(5)-nitroimidazole, 2- methyl-4(5)-benzyl-5(4)-nitroimidazole and 4(5)-tolyl-5(4)-nitroimidazole.

EXAMPLE 3—ANHYDROUS PROCESS

A nitrating solution consisting of nitric acid and oleum is prepared by placing 65 ml. of 65% oleum (containing 1.04 moles of free SO₃ and 0.455 mole of H₂SO₄) in a three-necked 500 ml. flask fitted with a stirrer, nitrogen inlet and outlet, addition funnel, thermometer, and a drying tube. The flask is then cooled in an ice bath and 24.5 ml. of 90% nitric acid (containing 0.525 mole HNO₃) is added with stirring over a period of one hour and forty minutes so that the temperature of the mixture remains between 2°–10° C.

A solution containing imidazole and sulfuric acid is prepared by adding 62.5 ml. (1.15 moles) of 98% sulfuric acid in a 100 ml. round-bottom flask equipped with a magnetic stirrer and a thermometer. The flask is then cooled in an ice bath and 25 g. (0.366 mole) of imidazole is added over a forty-minute period so that the temperature does not exceed 25° C.

The imidazole solution is then added to the nitrating mixture at such a rate that the temperature remains between 20°–30° C. The reaction mixture is then aged at room temperature for one hour and then heated in a water bath at 50° C. for three hours. After the heating period, the reaction mixture is carefully poured onto 1300 g. of ice and the pH adjusted to about 1 with 353 ml. concentrated ammonia with stirring. The precipitate is aged for fifteen minutes, filtered, and pressed dry with a rubber dam. The product is then washed twice with 100 ml. of water by slurrying for five minutes and refiltered. On drying to constant weight in vacuo at 80° C., a yield of 33.9 g. (82% of theory) of 4(5)-nitroimidazole is obtained. The melting point is 302°–304° C. The calculated excess SO₃ after nitration is 10.8%.

EXAMPLE 4—ANHYDROUS PROCESS

A nitration mixture is prepared in a 100 ml. three-necked flask fitted with a mechanical stirrer, thermometer, and nitrogen source. To 38 ml. of 30% oleum in the flask, cooled in an ice bath, is added 4.9 ml. of 90% nitric acid dropwise, keeping the temperature below 20° C.

5.0 g. imidazole is added in small portions (.1–.2 g. increments) maintaining the temperature at about 20° C. or lower. The reaction on addition of imidazole is exothermic. After addition of all imidazole the reaction mixture is aged for 2 hours.

After aging the reaction mixture is quenched onto 200 g. of ice with stirring, 40 g. of solid sodium hydroxide is added over a five-minute interval as well as additional ice (about 200 g.) to maintain room temperature. The quenched mixture is aged for 2 hours and then filtered to remove solids. The solids are washed with water and dried at 50° C. under vacuum to give 7.2 g. of product. The 4(5)-nitroimidazole yield is 87%. The calculated excess of sulfur trioxide at the end of nitration is 14.5%.

EXAMPLE 5—ANHYDROUS PROCESS

Using the equipment and techniques of the anhydrous nitration of Example 3, a nitrating mixture is prepared by adding 68.3 ml. of 65% oleum and 23.6 ml. of 98% nitric acid, with stirring and cooling, so that the temperature does not exceed 60° C. An imidazole-acid solution is prepared by dissolving 26.2 g. of solid imidazole in 43.6 ml. of 98% sulfuric acid, with stirring and cooling, so that the temperature does not exceed 50° C. The two solutions are then combined over a two-hour period, with stirring and cooling, so that the temperature remains at about 50°–60° C. Upon completion of the addition, the reaction mixture is aged for one hour at 50°–60° C. and subsequently quenched onto 150 g. of ice. The reaction mixture is then neutralized with 302 ml. of concentrated ammonium hydroxide, filtered at 25° C., and washed with water. A 91.3% yield of 4(5)-nitroimidazole, M.P. 302°–304° C., is obtained having a purity of about 95%. The calculated excess SO₃ after nitration is 17.1%.

When the procedure of Example 5 is repeated using 37.5 ml. of 98% sulfuric acid (1.43 ml. per g. of imidazole), the yield is increased to 95%.

EXAMPLE 6—ANHYDROUS PROCESS 28.8 g. of 2-phenylimidazole is added to a nitration mixture composed of 21.8 ml. of nitric acid (≥90%) and 64.5 ml. of oleum (≥30%), aged at 90° C. for one hour, quenched onto 500 g. of ice, filtered, washed and dried. A 91% yield of mixed isomer is obtained, M.P. 253°–260° C. About two-thirds is 2-(p-nitrophenyl-4(5) nitroimidazole, M.P. 289°–292° C.

Nitro substitution on the phenyl ring is prevented, if desired, by employing an electro-negative group on the phenyl ring, such as chloro, nitro or carboxamide. For example, when the process of Example 6 is repeated employing: 2-(4'-nitrophenyl)-imidazole, 2-methyl-4(5)-(4'-chlorophenyl)-imidazole, 2-(4'-carboxamidophenyl)-imidazole and 4(5)-(4'-nitrophenyl)-imidazole there is obtained the corresponding 2(4'-nitrophenyl-4(5)-nitroimidazole, 2-methyl-4(5)-(4'-chlorophenyl)-5(4) - nitroimidazole, 2-(4'-carboxamidophenyl)-4(5) - nitroimidazole and 4(5)-(4'-nitrophenyl)-5(4)-nitroimidazole.

EXAMPLE 7—HYDROUS PROCESS

Following the teachings of the prior art, 26.2 g. of imidazole is dissolved in 37.5 ml. of 98% sulfuric acid. The acid solution is maintained below 25° C. in an ice bath. 21.2 ml. of 65% oleum, 84 ml. of 98% white fuming nitric acid are mixed together to form a nitration mixture. The acid mixture and nitrating mixture are combined and allowed to react at about 60° C. The initial SO₃ concentration in the reaction mixture is 1%. After completion of the reaction, the reaction mixture is quenched in 500 g. of ice. 210 ml. of concentrated ammonia is added, with stirring, at room temperature to precipitate the 4(5)-nitroimidazole which is filtered, washed with water, and dried to give 23.6 g. of product for a 54% yield. The reaction mixture, after nitration, contained no excess sulfur trioxide.

What is claimed is:

1. A process for the preparation of a compound having the formula:

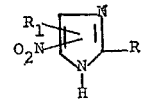

wherein R and R₁ are the same or different and are hydrogen, halo, alkyl of from 1 to 6 carbon atoms, phenethyl, benzyl, phenyl, nitrophenyl, chlorophenyl, carboxamidophenyl, tolyl, and xylyl, which comprises reacting a compound having the formula:

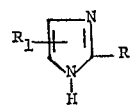

wherein R and R₁ are as previously defined, with a nitric acid-sulfuric acid-sulfur trioxide nitrating mixture containing sufficient sulfur trioxide to provide at least 10% by weight of the total reaction mixture of free sulfur trioxide throughout the course of the reaction.

2. The process of claim 1 in which the nitration temperature is from 20 to 170° C.

3. The process of claim 1 in which R is phenyl and $R_1$ is hydrogen.

References Cited

UNITED STATES PATENTS

| | | | |
|---|---|---|---|
| 3,098,872 | 7/1963 | Weakley et al. | 260—688 |
| 3,325,507 | 6/1967 | Kollonitsch | 260—309 |
| 3,502,776 | 3/1970 | Hoffer et al. | 260—309 |
| 3,399,211 | 8/1968 | Sarett et al. | 260—309 |

FOREIGN PATENTS

| | | | |
|---|---|---|---|
| 1,006,334 | 9/1965 | Great Britain | 260—309 |
| 660,836 | 9/1965 | Belgium | 260—309 |

OTHER REFERENCES

De La Mare et al., Aromatic Substitution Nitration and Halogenation, pp. 48–50 New York, Academic, 1959.

Hazeldine et al., J. Chem. Soc. (London) vol. 125, page 1434 relied on (1924).

Heertjes Rec. Trav. Chim., vol. 77, p. 693 relied on (1958).

Hofmann Imidazole and its Derivatives, Part I, pp. 127-8 New York, Interscience, 1953.

NATALIE TROUSOF, Primary Examiner

U.S. Cl. X.R.

260—688